March 22, 1955　　　F. C. WILLIAMS　　　2,704,809
WIRELESS SIGNALLING SYSTEMS

Original Filed July 25, 1947　　　　　　　3 Sheets-Sheet 1

F. C. Williams
Inventor

By Moore and Hall
Attorneys

March 22, 1955     F. C. WILLIAMS     2,704,809
WIRELESS SIGNALLING SYSTEMS
Original Filed July 25, 1947     3 Sheets-Sheet 2

F.C. WILLIAMS
Inventor
By
Attorneys.

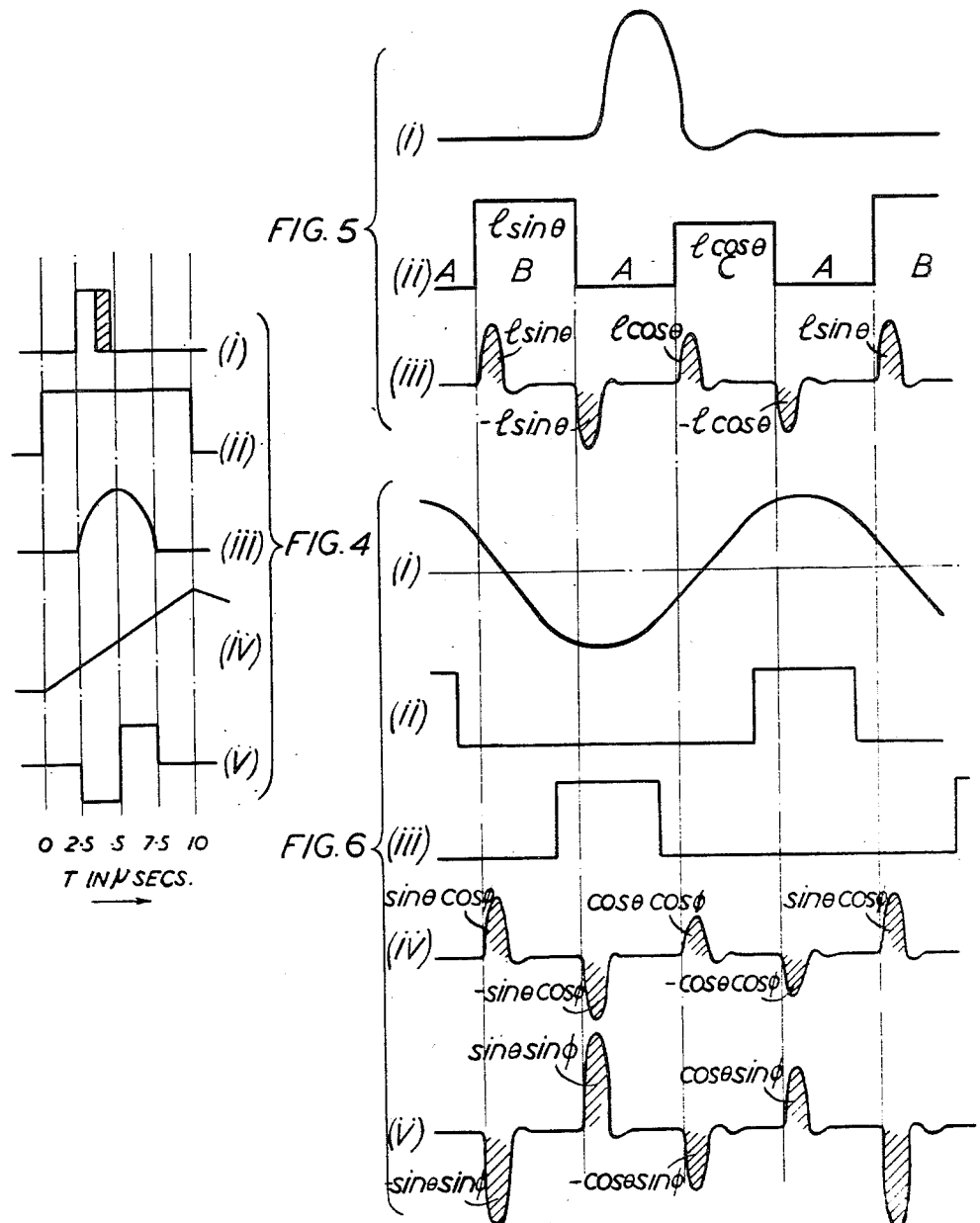

United States Patent Office 2,704,809
Patented Mar. 22, 1955

2,704,809

WIRELESS SIGNALLING SYSTEMS

Frederic Calland Williams, Timperley, England, assignor to Minister of Supply in His Majesty's Government of the United Kingdom of Great Britain and Northern Ireland, London, England Original application July 25, 1947, Serial No. 763,713, now Patent No. 2,490,394, dated December 6, 1949. Divided and this application September 26, 1949, Serial No. 117,915

Claims priority, application Great Britain June 14, 1945

10 Claims. (Cl. 250—27)

This application is a division of my prior co-pending application Serial No. 763,713 filed July 25, 1947, entitled Wireless Signalling Systems, now United States Patent No. 2,490,394, and is more particularly concerned with such systems in which pulse signals are employed and in which navigational information is conveyed by said pulse signals.

The object of the invention is to provide an improved phase discriminator arrangement for use in such a pulse-modulated signalling system.

According to the invention the phase discriminator includes an oscillator arranged for operation at the mean pulse recurrence frequency but capable of variation over a chosen frequency range centred about said mean frequency by the application of an appropriate controlling voltage thereto and phase-comparing means for determining the phase relationship between applied input pulse signals and an oscillation derived from said oscillator and providing a controlling voltage to said oscillator which tends to maintain the aforesaid phase relationship at a chosen value, said controlling voltage serving also to provide, by its variations, an output component related to the conveyed intelligence.

In order that the invention may be more readily understood one embodiment thereof, in its application to a navigational aiding system as described and claimed in co-pending application Serial No. 763,713, from which the present application is a divisional application, will now be particularly described with reference to the accompanying drawings in which:

Figs. 4, 5 and 6 are graphical waveform diagrams illustrating the operation of the mobile craft apparatus of Figs. 2 and 3.

Figure 1:
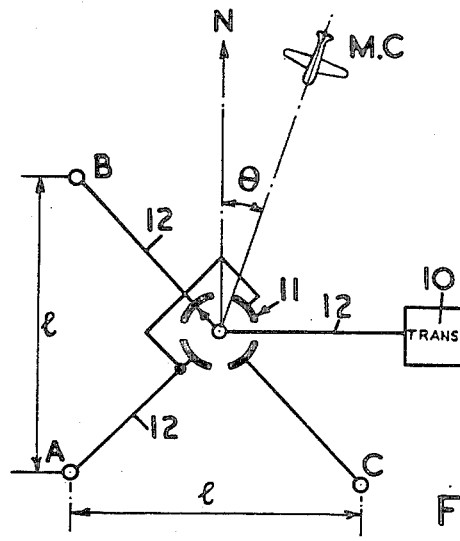
Fig. 1 is a schematic lay-out diagram of one form of ground transmitting or beacon station according to the aforesaid co-pending application Serial No. 763,713.

Referring first to Fig. 1, the ground transmitting or beacon station of the navigational system comprises three aerials A, B and C each having an omnidirectional radiation characteristic and located respectively at the corners of an isosceles triangle whose equal sides are of length $l$. These aerials are supplied through equal electrical length feeder lines 12 by a single transmitter 10. The aerials are connected to the transmitter in turn by a rotary switch 11 in the cyclic order A, B, A, C, A, B, A, C and so on.

The transmitter 10 generates short pulses of RF power of the order of, say, 1.5 microseconds duration at a constant repetition frequency of, say, 5 kc./s. The switch 11 is arranged to operate regularly at, say, 3,000 R. P. M. with the result that, assuming perfect switching, groups of 25 pulses are radiated from each aerial in turn in the cyclic order stated above. Each group cycle A, B, A, C will be recurrent 50 times per second while each group will last for 0.005 second. The radiation frequency used is, say, 200 mc./s. or higher.

The transmitted pulses are width-modulated on their back edges by a sine wave whose frequency is accurately related to the rotation of the switch 11, i. e. in the example quoted above, a 50 c./s. sine wave, hereinafter referred to as the "reference wave." In addition, the transmitted pulses may be subjected to further modulation, again on their back edges only, by speech or Morse for the purpose of providing a communication channel.

Considering now the signals received from such a beacon transmitter arrangement by a mobile craft, e. g. an aircraft mc. which is located at a bearing angle $\theta$ with reference to the direction through aerial A and B. The latter direction is conveniently, although not necessarily, one pointing due north. The aircraft will be assumed to be so remote from the beacon that the direct paths A—MC, B—MC and C—MC can be regarded without significant error as being parallel.

At the mobile craft there will be received the groups of pulses radiated in turn from the aerials A, B and C at the chosen 5 kc./s. recurrence frequency. As the pulses are switched from aerial A to aerial B there will be an apparent change in the phase of the new (B aerial) series of pulses relative to the old (A aerial) series because the first pulse of the series from aerial B will reach the mobile craft sooner, by a time proportional to $l \cos \theta$, than if it had been radiated from aerial A. Similarly, upon reversion to aerial A, 0.005 second later, there will be a further phase-change proportional to $-l \cos \theta$. Upon the following switching operation to aerial C there will be a phase change proportional to $l \sin \theta$ and upon the subsequent reversion to aerial A, a phase-change proportional to $-l \sin \theta$. This switching cycle is repeated continuously. These phase-changes are summarised in Fig. 5(ii) which is a plot of the time difference between the incoming 5 kc./s. pulses at the mobile craft MC and a steady series in phase with those from aerial A.

Figure 2:
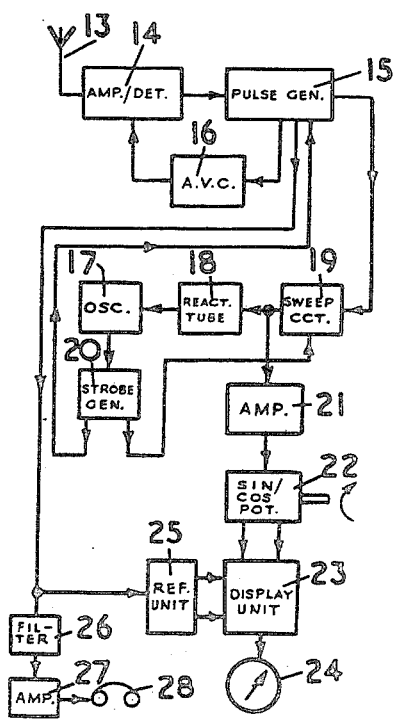
Fig. 2 is a block schematic diagram of one form of mobile craft apparatus also according to the aforesaid co-pending application Serial No. 763,713.

Referring now to Figure 2 which shows schematically the mobile craft equipment, pulse signals from the ground beacon are received by aerial 13, are suitably amplified and demodulated in receiver 14 which provides a rectified pulse-form output for application to a pulse generating unit 15 by which a 5 microsecond pulse is generated for each received pulse signal. These 5 microsecond pulses are arranged so as to be initiated in response only to the first 0.25 microsecond period following the leading edge of the related received pulse applied from receiver 14.

Associated with this unit 15 is an automatic volume control circuit 16 which serves to provide a controlling voltage which stabilises the gain of receiver 14 at a chosen level. This AVC unit is arranged to be quick acting whereby it brings the amplitude of the pulse output of receiver 14 to the chosen level within a few, e. g. three, pulses of the beginning of any series of similar pulses.

Unit 17 is an oscillator having a natural or free-running frequency substantially equal to the chosen pulse-recurrence frequency of the cooperating ground beacon e. g. 5 kc./s. This oscillator is arranged, however, to be varied continuously in the absence of any received signals, over a frequency range of ±1% e. g. from 5050 to 4950 c./s. by a reactance tube unit 18, which is, in turn, controlled by a sawtooth control waveform provided by a sweep valve unit 19. The natural sweep period is of the order of a few seconds.

The oscillator unit 17 also controls a pulse generating unit 20 which provides a 10 microsecond pulse accurately time related with each oscillation of the oscillator 17, and therefore varying in phase with respect to the incoming signal pulses. Such a pulse is hereinafter referred to as a "strobe" pulse. These 10 microsecond "strobe" pulses are fed back to the 5 microsecond pulse generator unit 15, where they serve to bring that unit, which is normally held inoperative, into operation during the actual strobe pulse periods. By this arrangement interference by signals arriving at times other than those corresponding to the anticipated arrival times of signals at the chosen pulse repetition frequency of the ground beacon station is avoided.

These 10 microsecond strobe pulses are also applied to the sweep valve unit 19 where, upon the occurrence of a chosen time relationship thereof with the 5 microsecond pulses from unit 15 which are time-related to the received signals, the natural sweeping action of unit 19 is suspended and the oscillator 17 thereby kept at a chosen frequency. This effect clearly occurs only when the frequency and phase of the pulses derived from oscillator 17 coincide with the frequency and timing of the received signal pulses so that the arrangement is effectively one which will search for and then lock onto the signal pulses from the chosen ground station. Any phase discontinuity in the latter pulses is equivalent to a temporary change of frequency and in the process of re-establishing the locked condition above referred to the sweeping valve unit 19 provides a control waveform for the reactance tube 18 of a form that bears a linear relationship to the sine- and cos-phase-change values already referred to.

The circuit constants of the synchronising arrangement thus provided are such that any small discontinuity in phase of the incoming signal is followed by the oscillator 17 within 0.0025 second. In order to perform this "re-phasing" the frequency of the oscillator 17 must be shifted from 5 kc./s. by the reactance valve 18 for a sufficient time to allow the integral of the change of frequency to equal the required phase shift. This follows from the fact that the phase-difference between two waves initially in phase is the integral of their frequency difference.

It follows from the above that when the phase of the received signals changes as shown in Fig. 5(ii) the frequency of the oscillator 17 will change as indicated in Fig. 5(iii) by virtue of the operation of the automatic synchronising means.

It further follows from the fact that phase is the integral of frequency that the areas under the pulses of change of frequency shown in Fig. 5(iii) are proportional to $l \sin \theta$ and to $l \cos \theta$ as indicated, and since the same channel is used for both, the constant of proportionality is the same for the $\sin \theta$ and $\cos \theta$ terms. As will be described later there is in the circuit, a voltage proportional to frequency which controls the reactance tube unit 18 and this control waveform is accordingly similar to Fig. 5(iii).

A version of the control waveform shown in Fig. 5(iii) is applied, after amplification in a linear amplifier 21 to a sin/cos potentiometer 22 by which two anti-phase versions of such control waveform at amplitude levels proportional respectively to the cosine and the —sine values of the angular control setting $\phi$ of the potentiometer are made available. These two outputs, which are illustrated graphically in Fig. 6(iv) and (v), are applied to a display unit 23 which is effectively a switching device by which selected portions each of said cos and —sin outputs may be applied in turn to a centre-zero indicating meter 24. The switching function of this display unit 23 is controlled so as to select the $-\sin \theta \cos \phi$ pulses of waveform, Fig. 6(iv), and the $\cos \theta \sin \phi$ pulses of waveform, Fig. 6(v), once during each cycle of the ground station aerial switching. Since this switching function must clearly be time controlled to synchronise with the ground beacon aerial switching cycle the necessary control for the display unit 23 is provided by applying the received signal pulses to a reference unit 25 where, by resolving the 50 c./s. width modulation imposed upon the rear edges of the received pulse signals, a 50 c./s. sine waveform is derived. From this waveform, shown in Fig. 6(i), there are developed two anti-phase square pulse switching waveforms, shown in Fig. 6(ii) and (iii), whose respective positive going pulses are appropriately timed to select the above stated portions of the two waveforms of diagrams (iv) and (v) Fig. 6 applied to the display unit 23 from the sin-cos potentiometer 22.

The resultant meter indication is proportional to $\sin (\phi - \theta)$ and will become zero or balanced when $\theta$ equals $\phi$ or $\phi + 180°$. The control shaft of the sin/cos potentiometer is provided with suitably calibrated setting means relating the ground beacon bearing angle $(\theta + \pi)$ to the values provided thereby so that, by adjusting the potentiometer to the required bearing angle and then navigating the craft so as to maintain a zero meter indicating, a straight course along such bearing direction may be travelled. Alternatively, by adjusting the potentiometer to obtain a zero meter reading, the bearing angle of the ground beacon, may be read off directly from the calibrated scale. The possible 180° ambiguity can usually be resolved in a number of known ways. The potentiometer calibration dial conveniently consists of a calibrated ring surrounding the centre zero meter 24.

The width modulated received signal pulses are also applied to a filter unit 26 which rejects the 5 kc./s. recurrence frequency and the 50 c./s. aerial switching frequency components and passes the remaining width modulation components (which may constitute a communication channel) to an amplifier 27 for ultimate operation of a sound reproducer such as headtelephone 28.

The receiving aerial 13 may be of any suitable form and is conveniently of omnidirectional character. The receiver 14 is of conventional form, more particularly of the type used in connection with pulse modulated radar systems. In one practical embodiment it had a sensitivity of 80 microvolts and bandwidth of 4 mc./s. at an operating frequency in the region of 200 mc./s. Units 15, 16, 21, 22, 23, 24 and 25 are more fully described and illustrated in my co-pending U. S. application Serial No. 763,713, now United States Patent No. 2,490,394.

Figure 3:
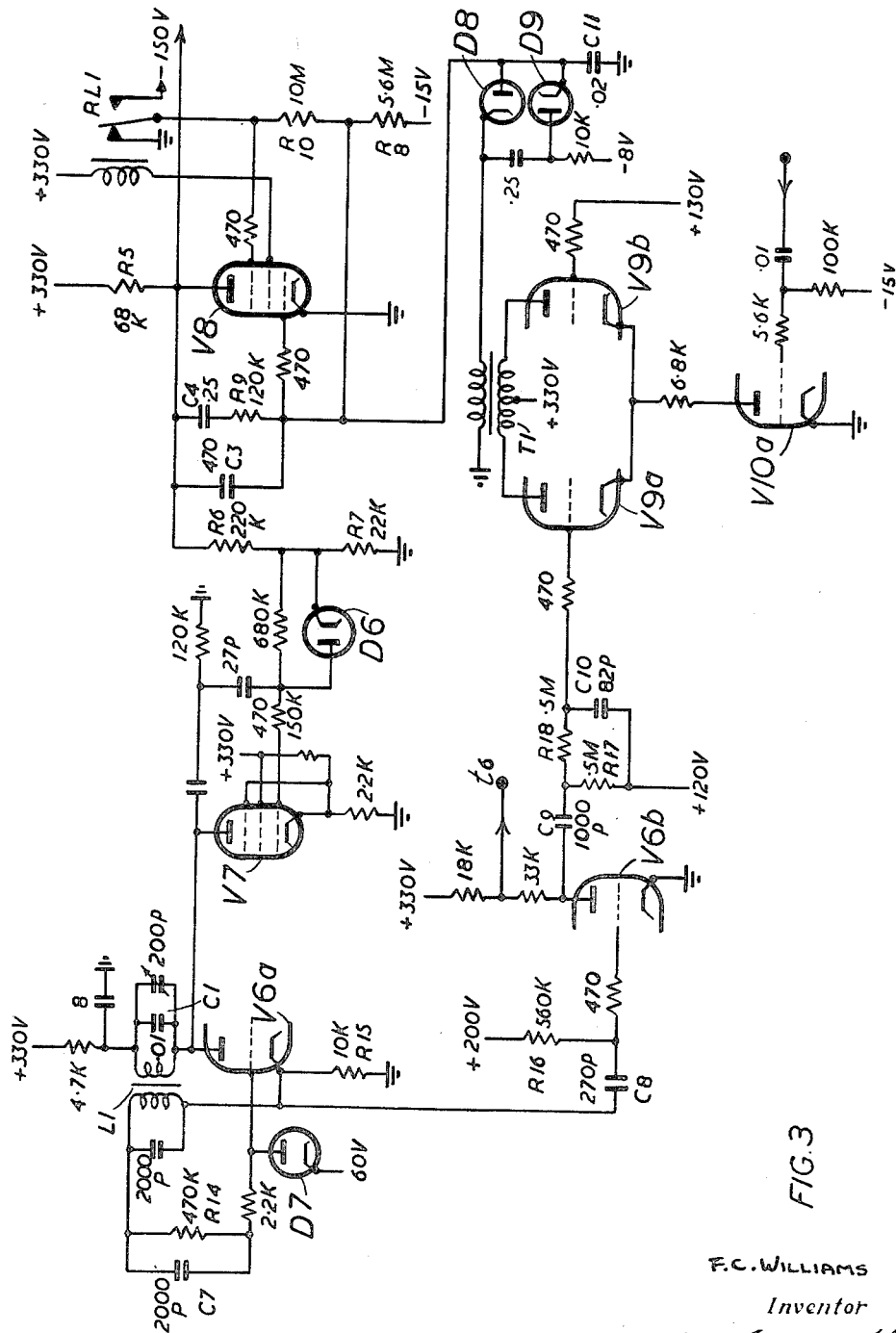
Fig. 3 is a circuit diagram of one embodiment of the phase discriminator of this invention.

One particular form of the phase discriminator of this invention comprising oscillator unit 17, reactance tube unit 18, sweep valve unit 19 and strobe pulse generating unit 20 is shown in Fig. 3; where valves V8, V9a, V9b and V10a with their associated diodes D8, D9 and other circuit components constitute the sweep valve unit 19 while valve V7 with diode D6 and other elements forms the reactance tube unit 18. Valve V6a and diode D7 constitute the 5 kc./s. oscillator unit 17 and valve V6b the stroke unit 20.

Valve V8 is arranged as a saw tooth waveform generator having a cycle period of the order of a few seconds. Its operation in the absence of a received signal input is briefly as follows. At the start of a cycle, the anode of V8 is at a voltage level, say +250 v., set by resistance network R5, R6 and R7. The control grid and the suppressor grid of the valve have previously been biased negatively due to connection of resistance R10 to a —150 v. supply by relay RL1 but, on account of the de-energisation of such relay, resistance R10 has just been connected to earth as shown.

Due to current flow through resistance R8, the control grid potential rises and the anode voltage runs down, being linearised by feed back network C3, C4, R9. Towards the end of the run down period the screen current increases, again energising relay RL1 and so bringing about reconnection of resistance R10 to the —150 v. supply. This causes cut-off of anode current and the charging of the feed back network through resistance R5. When the charging current begins to fall the control grid potential starts to move negatively whereby the screen current also falls and eventually de-energises relay RL to recommence the sweep cycle afresh. As already stated the period time for this cycle of events is several seconds.

The reactance tube V7 is supplied on its control grid with a proportion of the anode waveform of valve V8 from the junction of resistors R6, R7 whereby it acts as a capacitance in shunt to the tuned circuit L1, C1 of the oscillator valve V6a, the value of such capacitance being linearly related to the applied saw tooth control waveform from the sweep valve V8. In practice the application of this control voltage, in the absence of a received signal, causes the oscillator frequency to vary linearly between the limits of 5055 c./s. and 4950 c./s.

The oscillator valve V6a is of the Reinartz type but has a cathode load and a long time constant network C7, R14 in its grid circuit. The upper limit of the grid voltage swing is set at +60 v. by the diode D7 whereby an output in the form of positive pulses approximately 60 v. in amplitude and 20 microseconds in width are obtained at the cathode end of resistance R15. These pulses are applied to the grid of valve V6b by way of the network of condenser C8 and resistance R16. The negative-going trailing edge of each pulse serves to cut off the control grid of valve V6b and thereby to produce at its anode positive-going pulses which have a width of 10 microseconds set by suitable choice of the time constant of network C8, R16. These pulses are A. C. coupled by condenser C9 and resistance R17 about a potential level of +120 v. and are applied through integrating network C10 and R18 to the control grid of valve V9a. As a result, a rising saw tooth voltage is applied to the grid of valve V9a for the 10 microseconds of each pulse provided by valve V6b. The square positive-going 10 microsecond pulse from the anode of valve V6b is also applied by way of terminal $t_6$ to the pulse generating unit 15 where it constitutes the strobe pulse previously referred to.

Valve V9a and a second valve V9b are effectively in series with a further valve V10a which is normally held cut-off at its control grid, but which is, however, supplied at such control-grid with the 5 microsecond pulses generated by the pulse generating unit 15 in response to each received signal pulse. When such 5 microsecond pulse is applied to valve V10a, current normally flows through this valve and through valve V9b since the control grid of the latter is biased more positively than that of valve V9a. If the oscillator valve V6a is properly locked or synchronised with the pulse recurrence frequency of the received signals then the rising voltage applied from the anode of valve V6b reaches a level at which valve V9a is turned on at a time 2.5 microseconds after the initial edge of the 5 microsecond pulse applied to valve V10a so that, for the remaining 2.5 microseconds of the 5 microsecond pulse period, current flow is through valve V9a instead of through valve V9b. These conditions are illustrated in Fig. 4, where diagram (i) shows a received pulse signal with its rear edge width modulated as shown by the shaded region; diagram (ii) the 10 microsecond pulse generated at the anode of valve V6b, i. e. the "strobe" pulse; diagram (iii) the 5 microsecond pulse generated in unit 15 from the received signal pulse of diagram (i) and diagram (iv) the rising sawtooth waveform derived from the pulse of diagram (ii) and aplied to valve V9a. Under these conditions the current flow through the primary winding of transformer of T1 is reversed at an instant substantially coincident with the centre of the 5 microsecond pulse period. This is illustrated in diagram (v) of Fig. 4 which illustrates also the corresponding output current in the secondary winding of transformer T1.

The secondary winding of transformer T1 is arranged to apply its output through reversed diodes D8, D9 to charge a condenser C11 which is also connected to the control grid of the sweep valve V8. Normally each of these diodes is biased off since the control grid of V8 and the interconnected anode of diode D8 and cathode of diode D9 are approximately at the potential of —4 v. due to their connection to the junction of network R8, R10, now earthed at its upper end by relay RL1 whereas the anode of D9 is connected to a potential supply of —8 v. and the cathode of D8 earthed so that the anode of D8 is four volts below its cathode and the cathode of D9 is four volts above its anode. When the voltage across the secondary of transformer T1 is applied current flows through D8 during the first 2.5 microseconds of the 5 microsecond pulse period (assuming the reversal to take place at the mid-point as in diagram (v) (Fig. 4) and through diode D9 during the remaining 2.5 microseconds. The effective voltage across C11 is therefore zero and no mean current reaches the control grid of valve V8. If, however, the change-over point is displaced to one side or the other of the mid-point, due to relative phase displacement between the received pulse signals and those due to oscillator valve V6a, then the condenser C11 acquires a voltage of certain amplitude and polarity and this is in turn applied to the control grid of sweep valve V8 where it causes a related change of anode potential to cause reactance tube V7 to alter the frequency of oscillator V6a so as to restore the previously assumed condition of synchronism. In operation, upon initial switching-on of the mobile craft equipment there will probably be no coincidence between the received pulse signals and the 10 microsecond strobe pulses provided by the oscillator valve V6a. In consequence no derived 5 microsecond pulses will be available from the pulse generating unit 15 with the result that valve V10a (Fig. 4) will not be opened up. In such circumstances the condenser C11 will not be subject to any charging currents delivered by diodes D8, D9.

Under these conditions the sweep valve V8 will operate in the manner previously described to control the reactance tube V7 whereby the frequency of the oscillator valve V6a will be caused to drift between the limits of 5055 c./s. and 4950 c./s.

At some instant there will be substantial coincidence of both frequency and phase between the received signals and the strobe pulses from the oscillator valve V6a. When this occurs the valves V9a and V9b will be operated in the manner already described and a voltage will be developed across condenser C11. The amplitude and polarity of this voltage will depend upon the timing of the change-over point of the waveform shown in diagram (v) Fig. 4. If the change-over point occurs before the mid-point of the 5 microsecond pulse period then the condenser C11 will acquire a positive charge which will accelerate the potential rise of the control-grid of sweep valve V8 with consequent acceleration of the anode voltage run down which in turn decreases the frequency of oscillator valve V6a through the intermediary of reactance valve V7. As a result the timing of the 10 microsecond strobe pulses will be retarded relatively to the (assumed constant frequency) signal pulses whereby the next change-over point will occur nearer to the mid-point of the 5 microsecond pulse. If on the other hand the change-over point occurs after the mid-point then the condenser C11 will acquire a negative charge which retards the use of control-grid potential of valve V8 with resultant relative increase of the oscillator frequency.

Action as described above continues until the frequencies of the input signal pulses and the oscillator valve V6a are identical and the required phase relationship is obtained and thereafter the oscillator valve V6a is held locked to the incoming pulse signals. In practice the change-over point is not precisely midway of the 5 microsecond pulse period but is displaced slightly to one side or the other in order to provide just sufficient current to the control grid of valve V8 to cancel the sweep current previously referred to passing through resistance R8.

In the event of phase change between the received pulses, i. e., upon switching from one ground aerial to another the aforesaid balance of current flow in the anode circuit of valves V9a and V9b will be disturbed and the sweep valve circuits V8 appropriately effected to alter the oscillator frequency to re-establish locking. Since only the phase of the leading-pulse of each pulse group is altered relative to the last pulse of the previous group the aforesaid frequency change to re-establish locking will be followed by a further change of the oscillator frequency back to its original value. This is accomplished by a further control potential provided by the sweep valve V8 in similar manner to that already described. A representative waveform at the anode of valve V8 for one aerial switching operation is shown to an enlarged scale in diagram (i) of Fig. 5, while diagram (iii) of that figure shows an example of one complete cycle of aerial switching.

Since out of balance currents due to the relative phases of the signal and strobe voltages are integrated in the sweep valve circuit to produce the control voltage and since the control voltage changes the frequency of the oscillator, which in turn changes the phase, the circuit is of the feed back type with two integrations in the feed back loop i. e. the integration from current to voltage and the integration from frequency to phase. Hence the circuit has a natural period of oscillation and its resonance to impulses will be similar to that of an LC circuit. Intentional impulses, i. e., the phase changes of cos $\theta$ and sin $\theta$ previously mentioned are applied to the circuit and its response is controlled by the damping component R9 between the anode and control grid of valve V8. In practice, the circuit is so arranged that the base of each pulse of this control waveform, occupies approximately 45° of the total switching cycle period.

I claim:

1. A phase discriminator circuit for use in a wireless signalling system employing pulsed signals conveying information by phase variation of their pulse recurrence frequency which comprises oscillator means producing energy varying in repetition rate about a mean pulse recurrence frequency, a reactance circuit coupled to said oscillator and including means controlling said variation, means for deriving a pulse output from said oscillator and for feeding said pulse output to a pulse coincidence circuit, means for applying input pulses derived from said pulsed signals to said pulse coincidence circuit, means for deriving from said pulse coincidence circuit a controlling output depending upon the degree of coincidence of each pulse in said pulse output and a corresponding pulse of said input pulses, and means for feeding said controlling output to said reactance circuit whereby said controlling output also provides, by its variations, a component related to the conveyed intelligence, said pulse coincidence circuit comprising an integrating circuit connected to said means for deriving a pulse output, a first multielectrode thermionic valve the control grid of which is connected to the output of the said integrating circuit, a second multielectrode thermionic valve the control grid of which is connected to a source of potential having a potential fixed at the mid-potential of the excursions of the control grid potential of the said first valve, a third multielectrode thermionic valve connected in series with a common cathode connection of both of said first and second thermionic valves and having its control grid connected to a source of said input pulses, and means connected to the anodes of the first and second thermionic valves for providing an output dependent on the difference in the quantity of charge drawn through the anode of the first thermionic valve and second thermionic valve respectively.

2. A phase discriminator as claimed in claim 3 and wherein said means for deriving a controlling output from said pulse coincidence circuit comprises a condenser connected to the secondary winding of said transformer, two unilaterally conducting devices interposed one in opposite sense to the other between said condenser and said secondary winding and biasing means connected to said unilaterally conducting devices to inhibit the conduction thereof when the output from said secondary winding is zero.

3. A phase discriminator circuit for use in a wireless signalling system employing pulsed signals conveying information by phase variation of their pulse recurrence frequency which comprises oscillator means producing energy varying in repetition rate about a mean pulse recurrence frequency, a reactance circuit coupled to said oscillator and including means controlling said variation, means for deriving a pulse output from said oscillator and for feeding said pulse output to a pulse coincidence circuit, said pulse coincidence circuit comprising an integrating circuit coupled to said means for deriving a pulse output, a first multielectrode thermionic valve the control grid of which is coupled to the output of said integrating circuit, a second multielectrode thermionic valve the anode of which is coupled to the anode of said first valve through the primary winding of a transformer and the control grid of which is coupled to a source of potential having a potential fixed at the mid-potential of the excursions of the control grid potential of said first valve, and a third multielectrode thermionic valve coupled in series with the cathode of both of said first and second thermionic valves and having its control grid coupled to a source of input pulses, said pulse coincidence circuit including means producing a controlling output depending upon the degree of coincidence of each pulse in said pulse output and a corresponding pulse of said input pulses, and means for feeding said controlling output to said reactance circuit whereby said controlling output also provides, by its variations, a component related to the conveyed intelligence.

4. A phase discriminator circuit for use in a wireless signalling system employing pulsed signals conveying information by phase variation of their pulse recurrence frequency which comprises an oscillator arrangement for operation about a mean pulse recurrence frequency under the control of a reactance circuit coupled thereto, means for deriving a pulse output from said oscillator and for feeding said pulse output to a pulse coincidence circuit, said pulse coincidence circuit comprising an integrating circuit connected to said means for deriving a pulse output, a first multielectrode thermionic valve the control grid of which is connected to the output of said integrating circuit, a second multielectrode thermionic valve the anode of which is connected to the anode of said first valve through the primary winding of a transformer and the control grid of which is connected to a source of potential having a potential fixed at the mid-potential of the excursions of the control grid potential of said first valve, and a third multielectrode thermionic valve connected in series with the cathodes of both said first and second thermionic valves, means for deriving from said pulsed signals input pulses having half the duration of the pulses in said pulse output, means coupling said input pulses to the control grid of said third thermionic valve of said pulse coincidence circuit, means for deriving from said pulse coincidence circuit a control potential substantially proportional to the misalignment in time of substantially the center of each pulse of said pulse output with the center of a corresponding pulse of said input pulses, and means for feeding said control potential to said reactance circuit whereby said control potential also provides, by its variations, a component related to the conveyed intelligence.

5. A phase discriminator as claimed in claim 3 including sawtooth generator means having an output coupled to said reactance circuit.

6. A phase discriminator as claimed in claim 5 including means inhibiting the output of said sawtooth generator means by said controlling output.

7. A phase discriminator circuit for use in a wireless signalling system employing pulsed signals conveying information by phase variation of their pulse recurrence frequency which comprises oscillator means producing energy varying in repetition rate about a mean pulse recurrence frequency, a reactance circuit coupled to said oscillator and including means controlling said variation, means for deriving a sawtooth potential cycle once per cycle of oscillations derived from said oscillator and for feeding said sawtooth potential cycle to a thermionic valve circuit, means for applying input pulses derived from said pulsed signals to said thermionic valve circuit, means for deriving from said thermionic valve circuit a controlling output depending upon the position in time of a pulse of said input pulses relative to a corresponding sawtooth cycle, and means for feeding said controlling output to said reactance circuit whereby said controlling output also provides, by its variations, a component related to the conveyed intelligence.

8. A phase discriminator circuit as claimed in claim 7 wherein the said means for deriving a sawtooth potential cycle comprises means, connected to the said oscillator, for deriving a pulse output from the said oscillator, and an integrating circuit connected to the said means for deriving a pulse output.

9. A phase discriminator circuit for use in a wireless signalling system employing pulsed signals conveying information by phase variation of their pulse recurrence frequency which comprises oscillator means producing energy variable in repetition rate about a mean pulse recurrence frequency, a reactance circuit coupled to said oscillator for varying said repetition rate, control means generating a sawtooth sweep potential, said control means being coupled to said reactance circuit to control the effective reactance thereof and thereby selectively to vary the repetition rate of said oscillator means, means for deriving a pulse output from said oscillator and for feeding said pulse output to a pulse coincidence circuit, means for applying input pulses derived from said pulsed signals to said pulse coincidence circuit, means for deriving from said pulse coincidence circuit a controlling output depending upon the degree of coincidence of each pulse in said pulse output and a corresponding pulse of said input pulses, and means for feeding said controlling output to said control means to inhibit selectively the generation of said sawtooth sweep potential whereby said controlling output also provides, by its variations, a component related to the conveyed information.

10. A phase discriminator circuit for use in a wireless signalling system employing pulsed signals conveying information by phase variation of their pulse recurrence frequency comprising oscillator means operable about a mean pulse recurrence frequency under the control of a reactance circuit connected thereto, control means generating a sawtooth sweep potential and connected to said reactance circuit thereby to control selectively the pulse recurrence frequency of said oscillator means, means for deriving a pulse output from said oscillator and for feeding said pulse output to a pulse coincidence circuit, means for deriving input pulses from said pulsed signals which input pulses have half the duration of the pulses in said pulse output, means for applying said input pulses to said pulse coincidence circuit, means for deriving from said pulse coincidence circuit a controlling potential substantially proportional to the misalignment in time of substantially the center of each pulse of said pulse output with the center of a corresponding pulse of said input pulses, and means for feeding said controlling potential to said control means to inhibit selectively the generation of said sawtooth sweep potential whereby said controlling potential also provides, by its variations, a component related to the conveyed information.

(References on following page)

References Cited in the file of this patent

UNITED STATES PATENTS

| | | |
|---|---|---|
| 2,092,496 | Branson | Sept. 7, 1937 |
| 2,096,881 | Butler | Oct. 26, 1937 |
| 2,283,523 | White | May 19, 1942 |
| 2,288,575 | Stablein | June 30, 1942 |
| 2,369,663 | Dennis et al. | Feb. 20, 1945 |
| 2,377,327 | Seeley | June 5, 1945 |
| 2,396,395 | Smith | Mar. 12, 1946 |
| 2,421,022 | Francis | May 27, 1947 |
| 2,434,294 | Ginzton | Jan. 13, 1948 |
| 2,572,016 | Elbourn | Oct. 23, 1951 |
| 2,574,494 | Palmer | Nov. 13, 1951 |